United States Patent
Quakkelaar et al.

(10) Patent No.: US 9,910,733 B2
(45) Date of Patent: Mar. 6, 2018

(54) TRANSACTION COMPLETION IN A SYNCHRONOUS REPLICATION ENVIRONMENT

(71) Applicants: Rene Quakkelaar, Ter Aar (NL); Elena Lora-Gallardo, Issy les Moulineaux (FR); Christopher H. Rank, Longmont, CO (US)

(72) Inventors: Rene Quakkelaar, Ter Aar (NL); Elena Lora-Gallardo, Issy les Moulineaux (FR); Christopher H. Rank, Longmont, CO (US)

(73) Assignee: SYBASE, INC., Dublin, CA (US)

( * ) Notice: Subject to any disclaimer, the term of this patent is extended or adjusted under 35 U.S.C. 154(b) by 608 days.

(21) Appl. No.: 14/444,904

(22) Filed: Jul. 28, 2014

(65) Prior Publication Data

US 2015/0379105 A1    Dec. 31, 2015

(30) Foreign Application Priority Data

Jun. 26, 2014    (EP) .................................... 14290188

(51) Int. Cl.
     *G06F 17/30*      (2006.01)
     *G06F 7/00*      (2006.01)
     *G06F 11/14*      (2006.01)

(52) U.S. Cl.
     CPC .... *G06F 11/1402* (2013.01); *G06F 17/30581* (2013.01)

(58) Field of Classification Search
     CPC ...................... G06F 11/1402; G06F 11/30581
     See application file for complete search history.

(56) References Cited

U.S. PATENT DOCUMENTS

| | | | | |
|---|---|---|---|---|
| 6,823,355 B1 * | 11/2004 | Novaes | ................... | G06F 9/466 707/999.01 |
| 8,301,593 B2 * | 10/2012 | Hoffmann | ........... | G06F 11/2097 707/615 |
| 8,341,115 B1 * | 12/2012 | Natanzon | ............ | G06F 11/1471 707/613 |
| 8,620,862 B2 * | 12/2013 | Holenstein | .......... | G06F 11/2097 707/610 |
| 8,868,492 B2 * | 10/2014 | Garin, Jr. | .......... | G06F 17/30575 707/610 |
| 8,989,203 B2 * | 3/2015 | Kuroki | ............... | H04L 49/9005 370/235 |
| 2004/0010499 A1 * | 1/2004 | Ghosh | .............. | G06F 17/30368 |

(Continued)

*Primary Examiner* — Jeffrey A Burke

(74) *Attorney, Agent, or Firm* — Schwegman Lundberg & Woessner, P.A.

(57) ABSTRACT

Systems and methods are presented for completing transactions in a synchronous replication environment. In some embodiments, a computer-implemented method can include generating in a database server, an identifier to identify a database transaction. The method can also include transmitting the identifier to a replication server; receiving acknowledgement that the identifier is acknowledged by the replication server; storing the transaction in the database server; and executing the transaction after receiving acknowledgement from the replication server and after determining the transaction is stored in the database server; wherein transmitting the identifier to the replication server occurs in parallel with storing the transaction in the database server.

24 Claims, 8 Drawing Sheets

(56) References Cited

U.S. PATENT DOCUMENTS

2009/0106323 A1* 4/2009 Wong ................ G06F 17/30575
2009/0313311 A1* 12/2009 Hoffmann ........... G06F 11/2094
2014/0258241 A1* 9/2014 Chen ................. G06F 17/30371
                                                            707/683

* cited by examiner

TRANSACTION COMPLETION IN A SYNCHRONOUS REPLICATION ENVIRONMENT

CLAIM OF PRIORITY

The present patent application claims the priority benefit of the filing date of European Application (EPO) No. 14 290 188.3 filed Jun. 26, 2014, the entire content of which is incorporated herein by reference.

TECHNICAL FIELD

The subject matter disclosed herein generally relates to the processing of data. In some example embodiments, the present disclosures relate to systems and methods for transaction completion in a synchronous replication environment.

BACKGROUND

High availability disaster recovery (HADR) is a data replication feature that provides a high availability solution for both partial and complete site failures. HADR protects against data loss by replicating data changes from a source database, sometimes called the primary or simply database server, to a target database, sometimes called the standby, replicate (database) or replication server.

A partial site failure can be caused by a hardware, network, or software failure. Typically, without HADR, the database management system (DBMS) server or the machine where the database resides has to be rebooted. The length of time it takes to restart the database and the machine where it resides is generally unpredictable. Typically, it can take several minutes before the database is brought back to a consistent state and made available. With HADR, the standby database can usually take over in seconds.

A complete site failure can occur when a disaster, such as a fire, causes the entire site to be destroyed. The databases can be situated in different locations. If a disaster occurs at the primary site, data availability is maintained by having the remote standby database take over as the primary database with full functionality. After a takeover operation occurs, the original primary database can be brought back up and returned to its status of primary database.

Synchronous replication is a type of data replication technique typically used to recover data in the event of a partial or complete site failure. Synchronous replication can involve at least two databases and file systems and can deliver quick recovery of data without any significant data loss, while providing protection against problems related to database integrity. This ensures that data is replicated between systems efficiently without any losses.

Synchronous replication creates a remote copy of the data, which is an exact mirror image of the primary copy, when the primary copy is updated. The system with the primary copy proceeds after waiting for the data recording to have completed on the duplicate system.

Generally, in synchronous replication, only after completion of an input/output operation is confirmed at both the primary and mirrored sites, is the update operation considered complete. A rollback can take place at both locations when an incomplete operation takes place which ensures that the remote copy is an exact copy of the primary.

However, techniques for synchronous replication can be improved to increase speed and reliability.

BRIEF DESCRIPTION OF THE DRAWINGS

Some embodiments are illustrated by way of example and not limitation in the figures of the accompanying drawings.

DETAILED DESCRIPTION

Example methods, apparatuses and systems are presented for completing transactions in a synchronous replication environment.

According to aspects of the present disclosure, in a synchronous replication environment, a transaction can be executed on behalf of a client (user-task) and can sleep based on a pre-configured time-out. As used herein, a transaction can refer to a unit of work performed within a database management system. The commit record can be used to generate an identifier which is sent by a replication agent within the database server towards a replication server. Until this identifier is acknowledged by the replication server and the transaction is stored on disk, the client executing the transaction will sleep (wait). Sending the identifier by the replication agent and storing the transaction on disk can be executed in parallel. When receiving the identifier, the client wakes up and is allowed to continue if the transaction is also stored on disk. The transaction can then execute any post commit work and can then finish the transaction. These descriptions and more will be discussed in greater detail in relation to the following figures.

Figure 1:
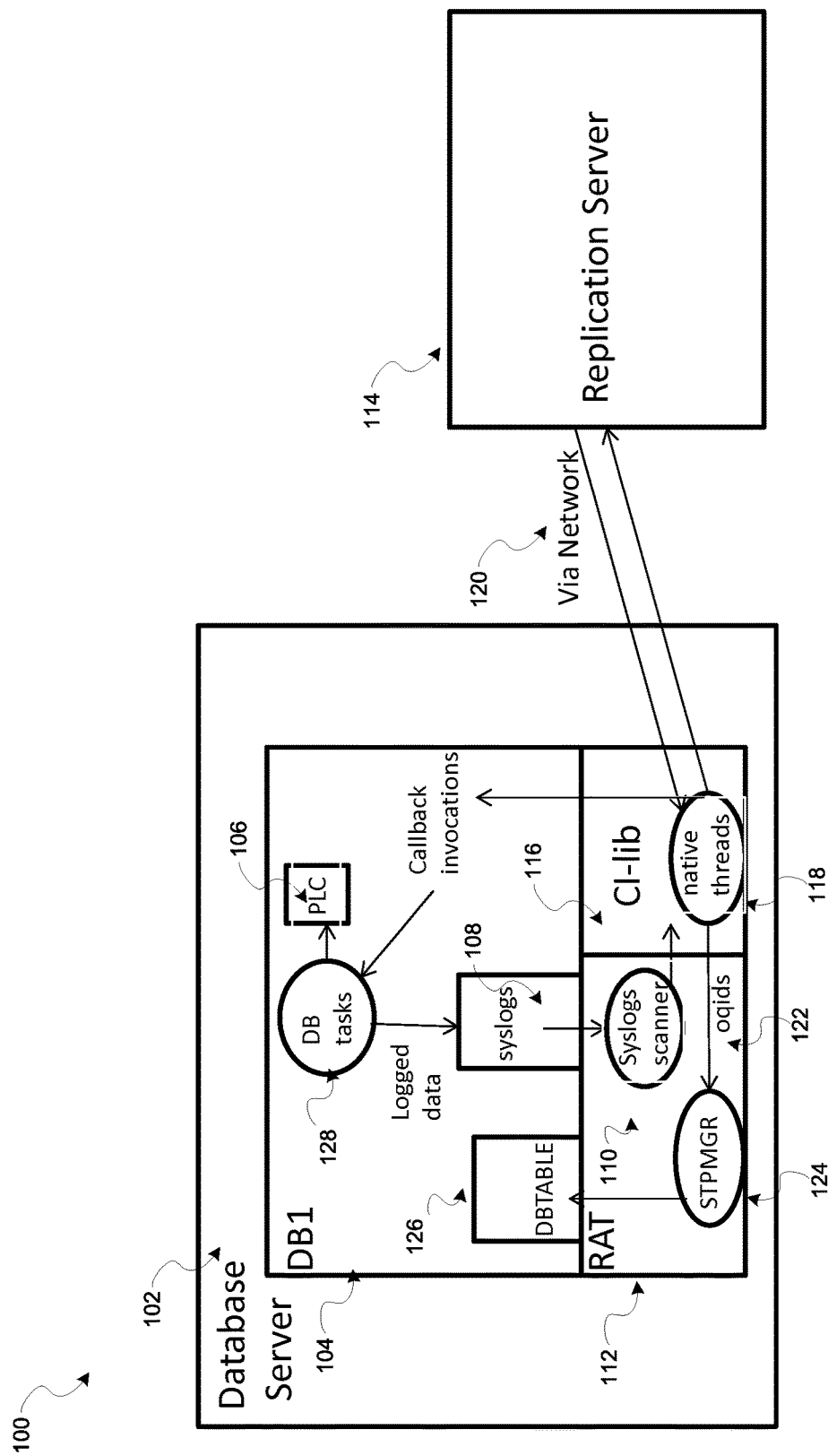
FIG. 1 is a replication server environment suitable for performing replication methods according to some example embodiments.

Referring to FIG. 1, example replication environment 100 illustrates a high level architecture for completing transactions, according to some example embodiments. Database Server 102 can include one or more database engines 104 (e.g. DB1) configured to execute transactions on behalf of a client. Various database tasks 128 can be invoked by a client to execute various instructions, such as reading or writing database entries to disk. In some example embodiments, the instructions can be forwarded to a private log cache (PLC) 106, which can include memory that holds data that later on would be flushed toward a database log. A PLC 106 can be used to reduce contention when writing to the last log page of a database log. The instructions can also be forwarded to a system log 108, which can include one or more tables that represent the database log.

In some example embodiments, the information in system logs 108 can be read by a scanner 110, which can be housed within a replication agent thread (RAT) module 112 of the database engine 104. RAT 112 can be the module responsible for replicating data from the database server 102 over to the replication server 114. In some example embodiments, scanner 110 passes on the transaction information to component interface (CI) library (CI-lib) 116. The CI-lib 116 can be an external library that can be loaded when needed, and can conduct various database functions. In addition, the CI-lib 116 can be reconfigurable via updates without needing to reconfigure the entire database. In some example embodiments, native threads 118 schedule the transaction to be recorded at replication server 114 via a wired or wireless network 120. A native thread 118 can refer to a thread that is scheduled by the operating system (OS), rather than by the database engine 104 or database server 102. Native threads 118 can also be configured to pass origin queue identifiers (OQIDs) 122 to a secondary truncation point manager (STPMGR) 124, within the RAT 112. OQIDs 122 can be used for duplicate and loss detection when replicating transactions, and can also be used to determine where to restart applying transactions during a recovery. The STPMGR 124 can refer to a module that is responsible for updating database table structures so that a secondary truncation point can be moved. This analysis can then be used to update the database table (DBTABLE) with the new secondary truncation point. In some example embodiments, storing the secondary truncation point in the DBTABLE 126 and waiting for an acknowledgement from replication server 114 can occur in parallel, thereby reducing the time to conduct synchronous replication of tasks. These processes will be described in more detail, below.

Figure 2:
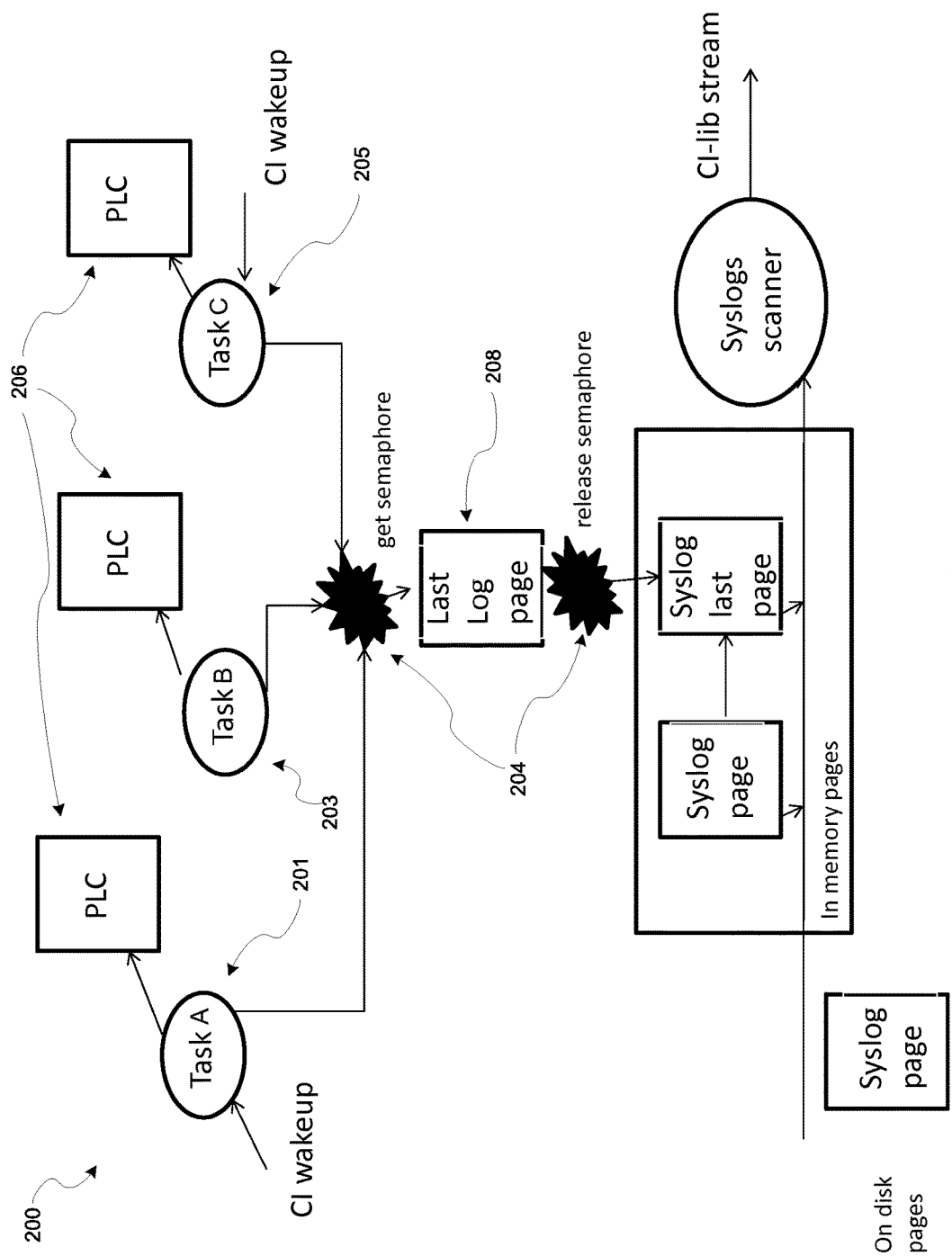
FIG. 2 is a diagram illustrating an example architecture for performing synchronous replication, according to some example embodiments.

Referring to FIG. 2, synchronous architecture model 200 illustrates an example timing flow for conducting transactions according to some example embodiments. Here, multiple tasks (e.g., TASK-A 201, TASK-B 203, TASK-C 205) can be launched in parallel or at least roughly the same time. The tasks 201, 203, 205 can be handled in some priority. A separate task can push data from the database log towards CI-lib. A task can flush the PLC 206, while at the same time store data of the task on the last log page 208. As used herein, the last log page 208 can refer to the last page in the system logs. In some cases, the last log page can be actual memory that represents the flushed PLC(s) that also is in the system logs format. A semaphore 204 can be used to facilitate access to the last log page. As used herein, a semaphore can refer to a variable or abstract data type that is used for controlling access to a common resource in a parallel programming environment.

Still referring to FIG. 2, on commit of a task 201, 203, or 205, the task 201, 203, or 205 can fall asleep, meaning it will wait to conduct any action until prompted. The data of task 201, 203, or 205 can be read from system logs in memory and pushed into CI-lib by this separate task. In parallel, a CI-lib callback command can wake-up any DB task when it notices, based on the returning OQIDs from the synchronous replication server (SRS), that a task can be awakened as the data is safely stored.

The architecture shown in FIG. 2 can allow for a number of technical effects. For example, the CI-lib interaction can be removed from the task execution path, e.g., the sequence of code that is executed by the user (e.g., task) to perform work for completing an active transaction, which can result in no overhead being introduced on the non-commit PLC flushes in the DB system. Also, reading the data from system logs means the log data is in the right order and is correctly formatted. OQIDs can also be easily generated using the current infrastructure as shown. Any future change involving log records can be automatically supported in sync mode, as well. Sync mode can refer to a mode of operation whereby a transaction the primary database does not complete until it is applied on the replicate site. The user executing the transaction would wait until the data is replicated and acknowledged.

Additionally, using a separate task for accessing system logs can allow for reading forward/backwards in system logs at any time using the available schema caching infrastructure. As used herein, schema caching can refer to in-memory cache in the database management system that keeps track of the objects being involved in the replication of the associated data. This means that in some cases, the same support as in asynchronous mode can be achieved without having to add logic. This also suggests that in this example architecture, switching from asynchronous mode to synchronous mode and back can be achieved easily. "Sync" in this example model shown in FIG. 2 means a task sleeps on commit. If switching to asynchronous mode mid-stream is needed or desired, there is no problem as it only affects the sleep on commit.

Other non-limiting technical effects can also be apparent. For example, log records written to system logs outside the context of a DB-task can be supported. In this sync model, the scanner can use the CI "raw-mode," e.g., the data is sent as stored in the database log, with no additional translation or conversion involved, to transfer data towards a replication server. This means references, e.g., addresses towards locations in memory of the hardware being used, are passed in instead of preparing the data in memory.

In some example embodiments, a separate set of replication agent threads read/process log records and send the data towards the replication server. This is in contrast to having each user (e.g., client) task executing SQL to perform the same task while processing SQL on behalf of an application. This can be another advantage, as this separate set of threads can be viewed as a level of parallelism achieved as user tasks execute SQL and in parallel the logged data is sent by the replication agent.

As another example advantage, in some example embodiments, a user task can only sleep when executing a commit. For other data generated, there is no impact based on aspects of the present disclosure. Before the user task goes to sleep, the task can be scheduled to be stored to disk, while in parallel the commit is sent towards the replication server. In some example embodiments, inside the replication agent 112, there is a native thread that processes the acknowledgments coming back. The acknowledgement can wake-up the user task sleeping on the disk I/O (assuming disk I/O is done). In the meantime, the other replication threads are still sending data. Based on this example implementation, the impact on the user task executing SQL can be minimized, while the throughput of the amount of data sent from the database server to the replication server can be maximized.

In addition, the example architectures proposed herein can use the log as the basis for replication. This can have several implications. For example, if the replication agent module was stopped for any good reason, during the next startup, the module can start in async mode to ensure data accumulated in system logs will be transferred to the replication server. Once the rep agent module has reached the end of the log, it can switch to sync mode. Also, using the architecture described herein, this switch can be performed automatically if desired.

Due to the synchronous mode example implementation having a similar architecture to an asynchronous mode example implementation, it is easier to switch modes, e.g. async to sync mode, or vice versa. The example descriptions also have an advantage in that embodiments do not need to be integrated in any user task. By doing so, the example implementations for sync and async are similar, which can make sharing code and functionality between the two modes easier. One can imagine that when a sync mode example implementation is integrated in the user-task context a mode switch would be much more complex. Each user task would need to release resources and stop replicating in sync mode. Then the replication agent would need to assist in the implementation for async mode. With the proposed descriptions, on the other hand, all is taken care of in the replication agent thread context. Switching modes is therefore easy because no user task is affected directly and replication is already up and running.

Figure 3:
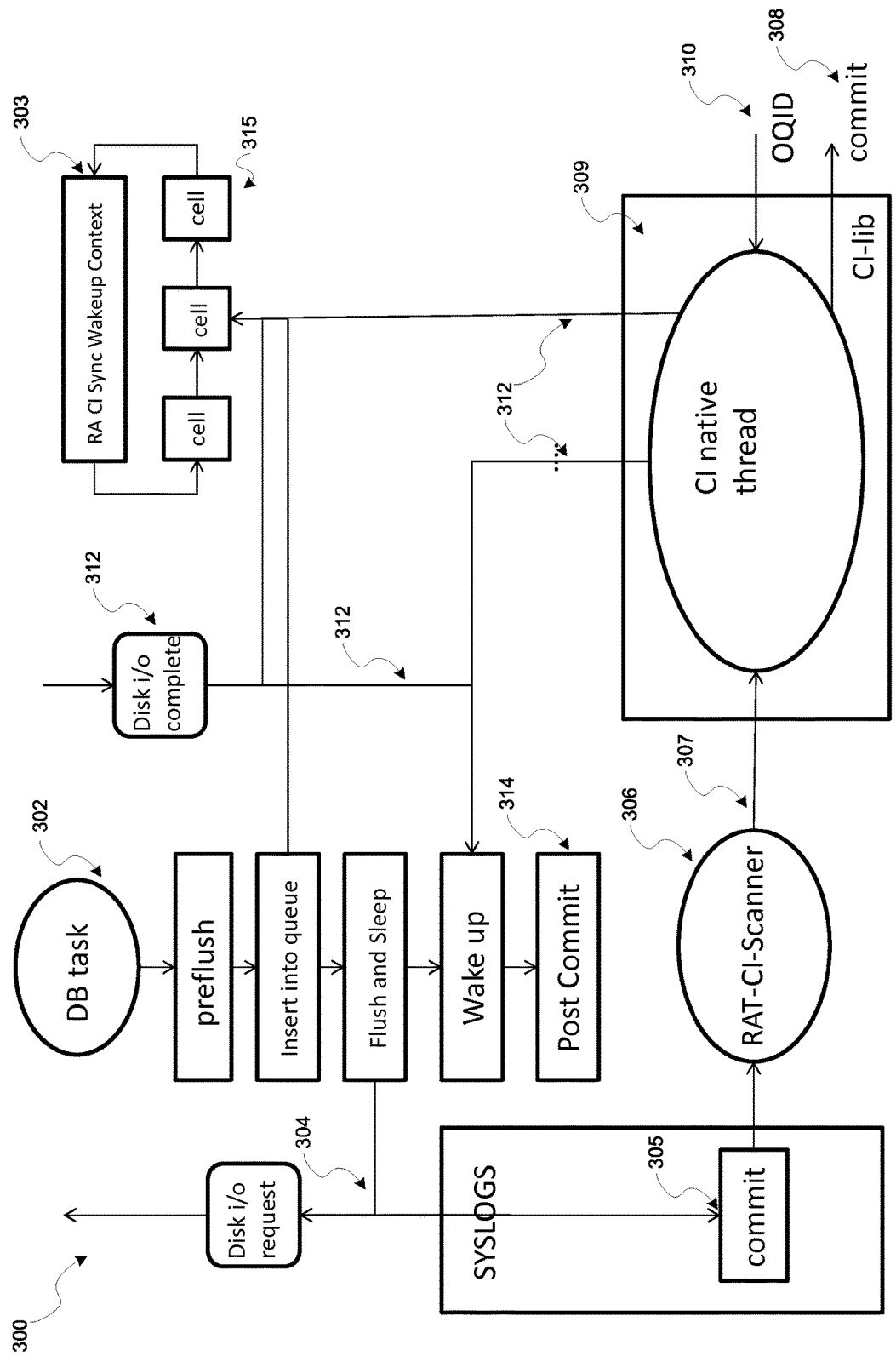
FIG. 3 is a diagram illustrating various processes of synchronous replication performed in parallel, according to some example embodiments.

Referring to FIG. 3, functional flow diagram 300 illustrates an example flow for conducting multiple processes in parallel during synchronous replication, according to some example embodiments. The parallel processing described herein can help achieve the example architecture with the stated non-limiting technical-effects described in FIG. 2. For example, here, the user task 302 performing an operation can wait for the task to be written to the DB disk. As used herein, the term "user task" and DB task 302 can be used interchangeably. In parallel, the commit 305 can be forwarded to a replication server, such as replication server 114. The user task can be awakened once both operations (e.g., disk I/O and acknowledgement from the replication server (RS)) have been received.

Parallelism can be achieved because the scanner task 307 forwards the data to RS while the user task is waiting for I/O completion. As used herein, a scanner task can refer to an internal database management task that scans data from the log. Because the network I/O in general is slower typically in conventional DB architectures, it is more often the case that the disk I/O completes before the acknowledgement from RS is received.

Still referring to FIG. 3, an example flow according to diagram 300 will be described as follows. At operation 302, the DB task commits the transaction and executes a pre-flush. As used herein, a pre-flush can refer to the flushing of contents of log data in memory towards disk memory, which can occur before doing the actual disk I/O itself. This results in the PLC being flushed towards system logs in memory. The DB task will insert itself in the Rep Agent-CI Sync wakeup queue 303. The cell 315 can contain, for example, the timestamp of the commit and the event the DB-task will sleep on. As used herein, a cell can refer to an in-memory structure used to communicate between two different software components, such as the database management system and a library.

At operation 304, the DB-task flushes the system logs in memory pages toward the disk and falls asleep on the event in the wakeup cell in the queue.

In parallel with operation 304, the Rep Agent-CI Scanner picks up the commit from system logs, transforms the commit into a CI command and pushes the commit into CI-lib 309 (see operation 306).

Thereafter, at operation 308, the commit is sent towards a replication server.

At operation 310, eventually, the replication server returns an OQID or some other kind of acknowledgement that it has received the commit task.

In parallel with operation 310, two scenarios can happen: either the disk I/O returns first, i.e., writing the transaction to disk (which is more likely to happen), or the OQID comes back first, which represents the acknowledgement for the commit from the replication server. These actions are represented by the operation 312 indicators.

If the disk I/O returns first, the cell status for that commit is updated reflecting the disk I/O is finished. When the acknowledgement is received from the replication server, the CI-callback function selects the cell based on the OQID received. The executing thread that tries to wake up the DBMS task then finds the disk I/O as completed. Because both the disk I/O and acknowledgement are received, the CI callback wakes-up the DB-task.

If the acknowledgement returns first, the cell status for that commit is updated reflecting that the acknowledgement is finished. When the disk I/O is finished, the cell for the commit is examined. Because the acknowledgement is received, the finishing of the disk I/O triggers a wakeup for the DB-task (which sleeps on the event in the cell). In either case, the DB-task is instructed to wake up after both the acknowledgement from the replication server is received and a determination is made that the disk I/O on the database server side is completed.

At step 314, after the DB-task is woken up, any post commit actions can be performed.

The proposed architecture of FIG. 3 can allow for a number of non-limiting technical effects in comparison with other conventional models for performing synchronous replication. For example, for each PLC flush (not caused by a commit), data does not need to be pushed to CI-lib. Also, the need to have a schema cache lookups on the execution path of every task can be avoided. Additionally, when a schema change is done on the primary database, the scan forward/backwards in the log to locate the correct schema for every task can be avoided. Furthermore, aspects of the present disclosure discuss methods for conducting synchronous replication that can be transaction based. The proposed methods can therefore be de-coupled from any underlying hardware, and can be based on the commit records received in a database server. The proposed methods therefore also can be able to perform synchronous replication across larger distances.

In general, storing the DB task to disk in the database server and waiting for the replication server acknowledgement of the task in parallel improves performance from a time perspective. Example timings will be shown in more detail in the following figures.

Figure 4:
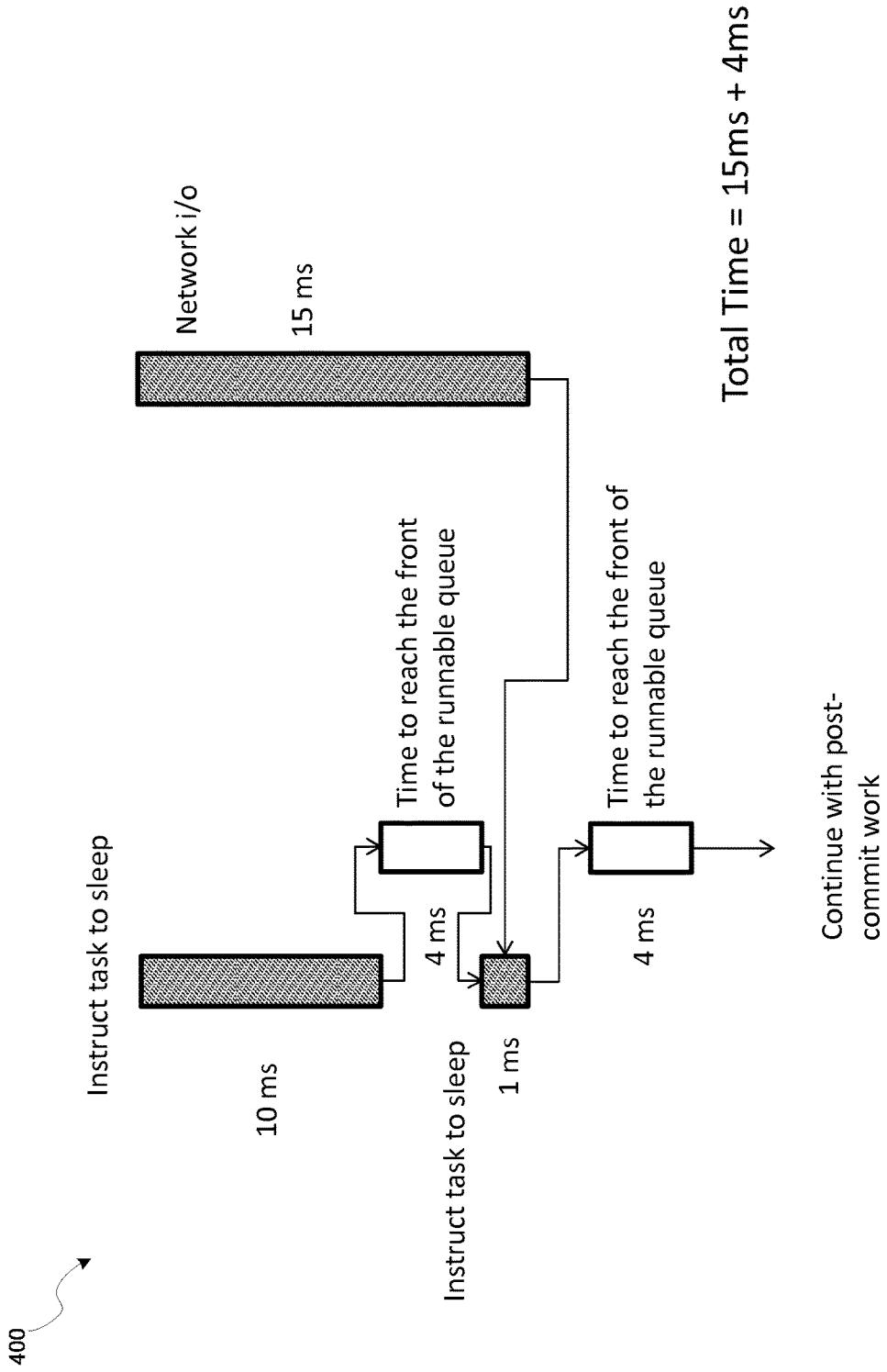
FIGS. 4-6 are example timing diagrams, according to some example embodiments.

Referring to FIG. 4, an example timing diagram 400 based on the parallel processing described in FIG. 3 and throughout the present disclosures, is shown. In this example, 10 milliseconds (ms) is used as an example amount of time for the disk I/O to complete, and 15 ms is used as an example amount of time for the network acknowledgement. Here, a function call instructs the DB task to sleep at the beginning of this timing diagram. After 10 ms, a wakeup follows because the disk I/O is done. However, the task cannot continue because the acknowledgement from the replication server is not received yet. The task will continue sleeping, which takes 4 ms in this example, and when the acknowledgement is received (at 15 ms) the task gets a final wakeup to continue. It again takes 4 ms to get to the front of the run-queue of the engine. When the front of the run-queue is reached, the task can continue executing code necessary for the post commit work (i.e. finalizing the actual transaction). Thus, total time in this example is 15 ms+4 ms=19 ms.

Figure 5:
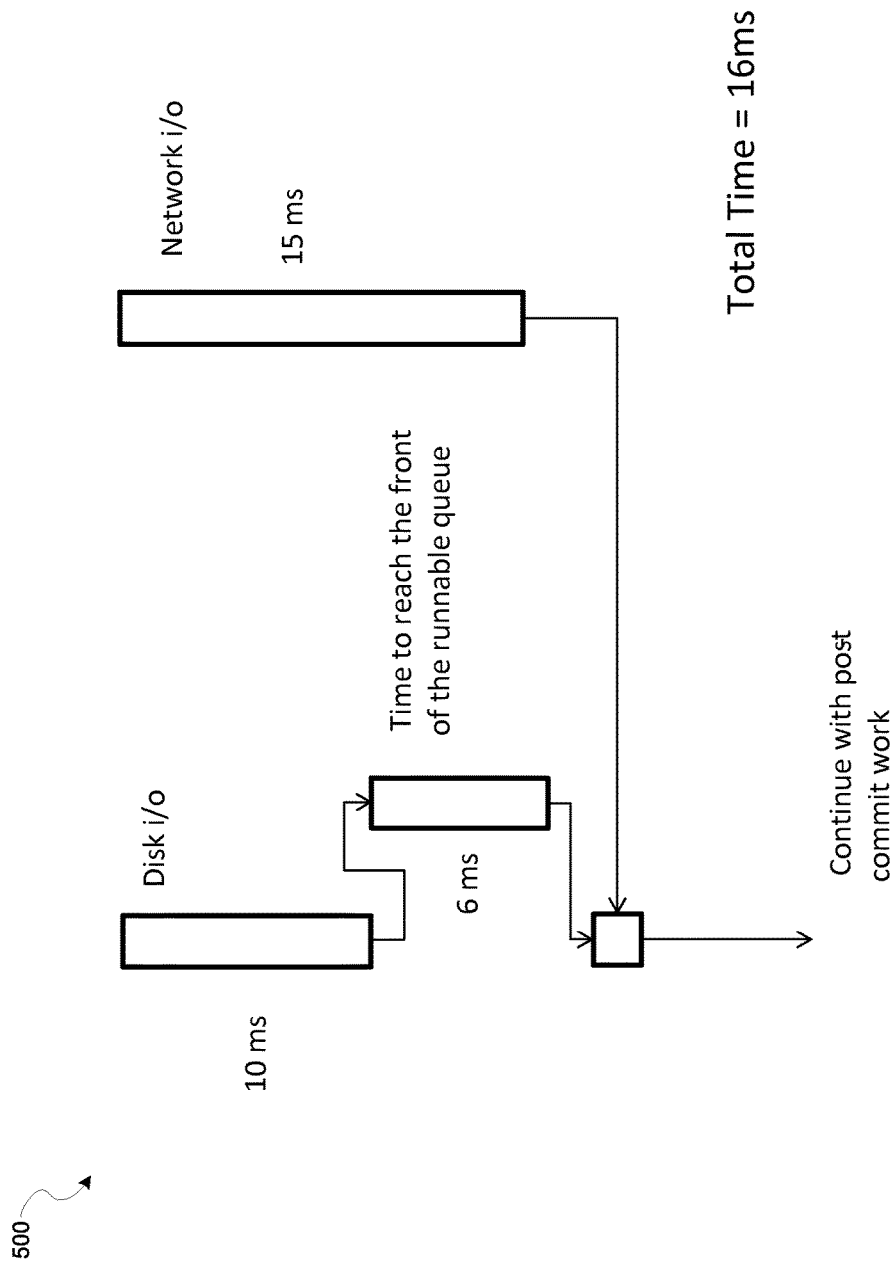

Referring to FIG. 5, another example timing diagram 500 based on the parallel processing described in FIG. 3 and throughout the present disclosures, is shown. In this example, the disk I/O is completed before the network acknowledgement is received, but it takes more time to get to the front of the run-queue after the first wake up. In this case, a second call to instruct the task to sleep is not needs as the task is already awake when both disk I/O and the network acknowledgement are completed. Post-commit work can continue as is for this transaction. In this case, total time for completing both the disk I/O storage and receiving acknowledgement from the replication server is 16 ms.

Figure 6:
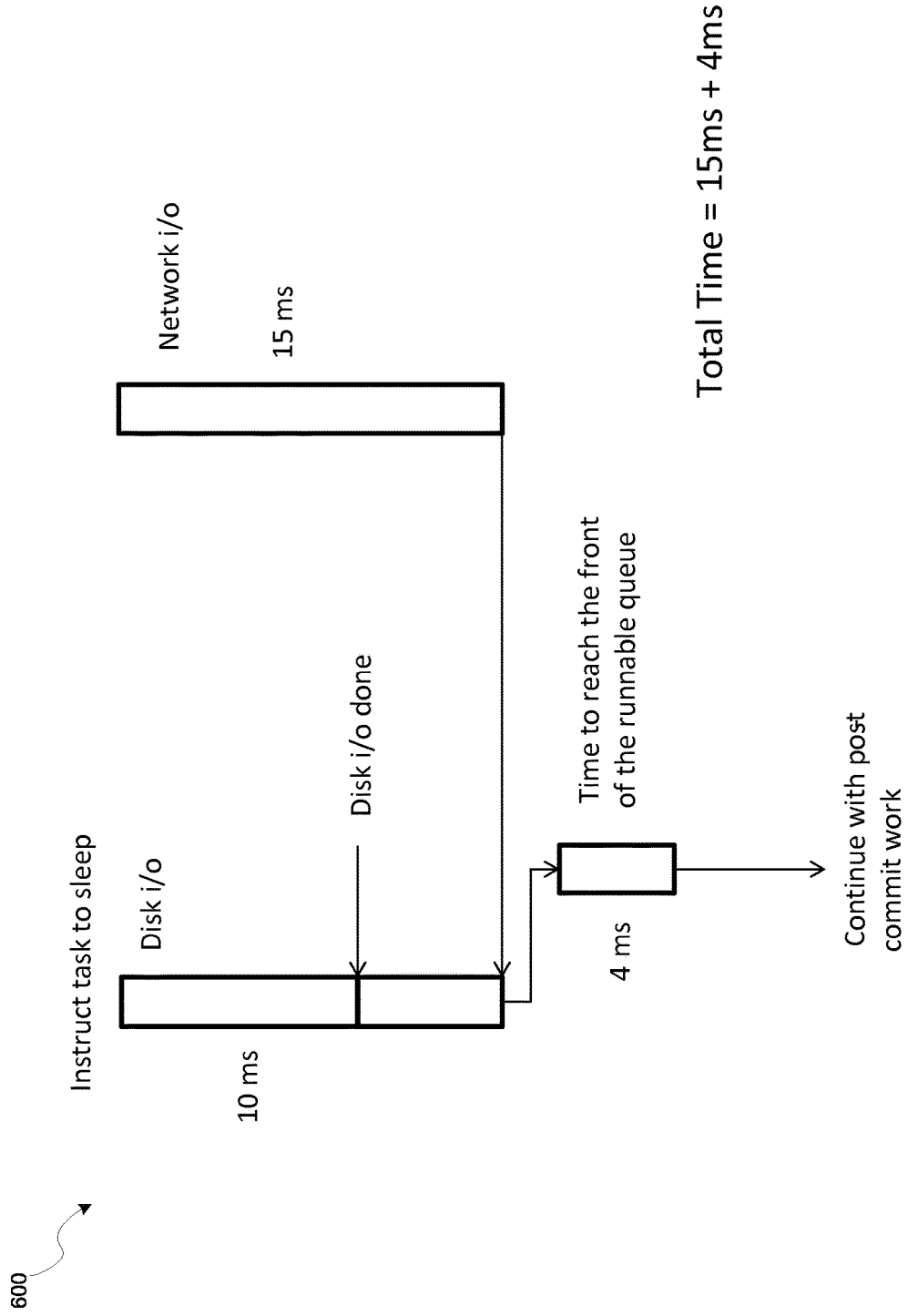

Referring to FIG. 6, another example timing diagram 600 based on the parallel processing described in FIG. 3 and throughout the present disclosures, is shown. In this case, a task is instructed to sleep once, prior to storing the task and prior to sending the task to the replication server. The task then receives only a single wakeup call when both events are completed. In this case, the functions of sleeping, then waking up, then sleeping again, then waking up again, etc., are minimized, which can reduce performance bottleneck. Total time in this case, due to the time taken still to reach the front of the runnable queue, is 19 ms.

Figure 7:
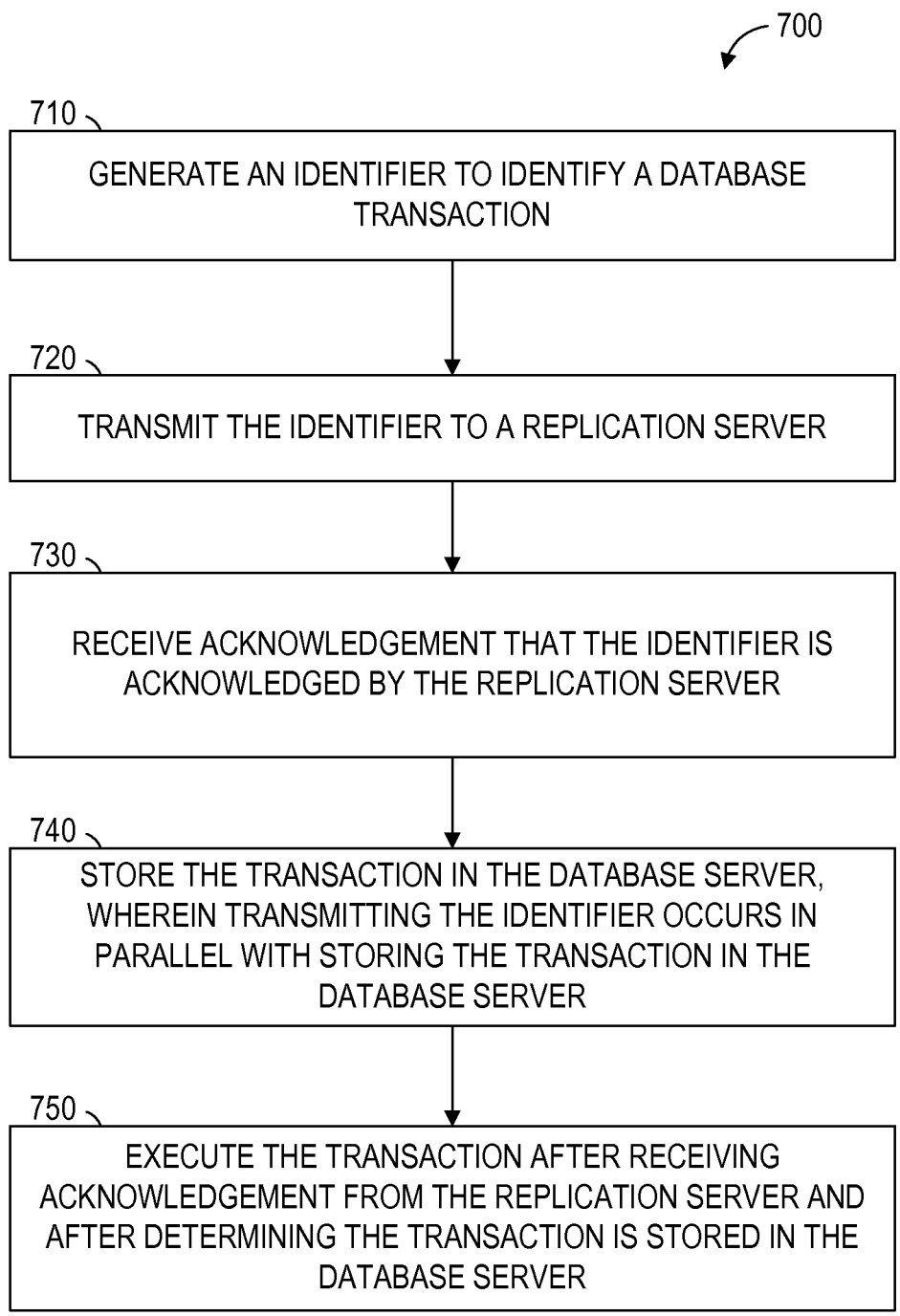
FIG. 7 is a flowchart illustrating example operations for conducting transactions in a synchronous replication environment, according to some example embodiments.

Referring to FIG. 7, the flowchart illustrates an example method 700 for completing transactions in a synchronous replication environment. The example methodology can be consistent with the methods described herein, including, for example, the descriptions in FIGS. 1, 2, 3, 4, 5, and 6. The method 700 can be performed by processing logic that can comprise hardware (e.g., circuitry, dedicated logic, programmable logic, microcode, etc.), software (e.g., instructions run on a processing device), or a combination thereof. In one implementation, the method 700 is performed by database server 102 in FIG. 1, as described below.

At block 710, a database server or a processor in a database server generates an identifier to identify a database transaction. An example of an identifier as discussed herein can include an OQID, but other identifiers can be apparent to those with skill in the art.

At block 720, the identifier is transmitted to a replication server. An example replication server can include the replication server 114, but in general, the replication server can be a server designed to replicate transactions conducted by the database server. The replication server can process the identifier and determine that a transaction is to be conducted, and should be recorded in the replication server. The replication server can then transmit back an acknowledgement that it is received the identifier.

At block 730, the database server receives acknowledgement that the identifier is acknowledged by the replication server. An example of the acknowledgement can include an OQID coming back from the replication server.

At block 740, and occurring in parallel to the actions in block 730, the database server stores the transaction. In some example embodiments, during the actions in blocks 730 and 740, the transaction can be instructed to sleep, meaning that the transaction is instructed to wait until it is given the authorization to proceed.

At block 750, after receiving acknowledgement from the replication server and after determining the transaction is stored in the database server, the transaction is executed. In some example embodiments, this can also include waking up the transaction.

Figure 8:
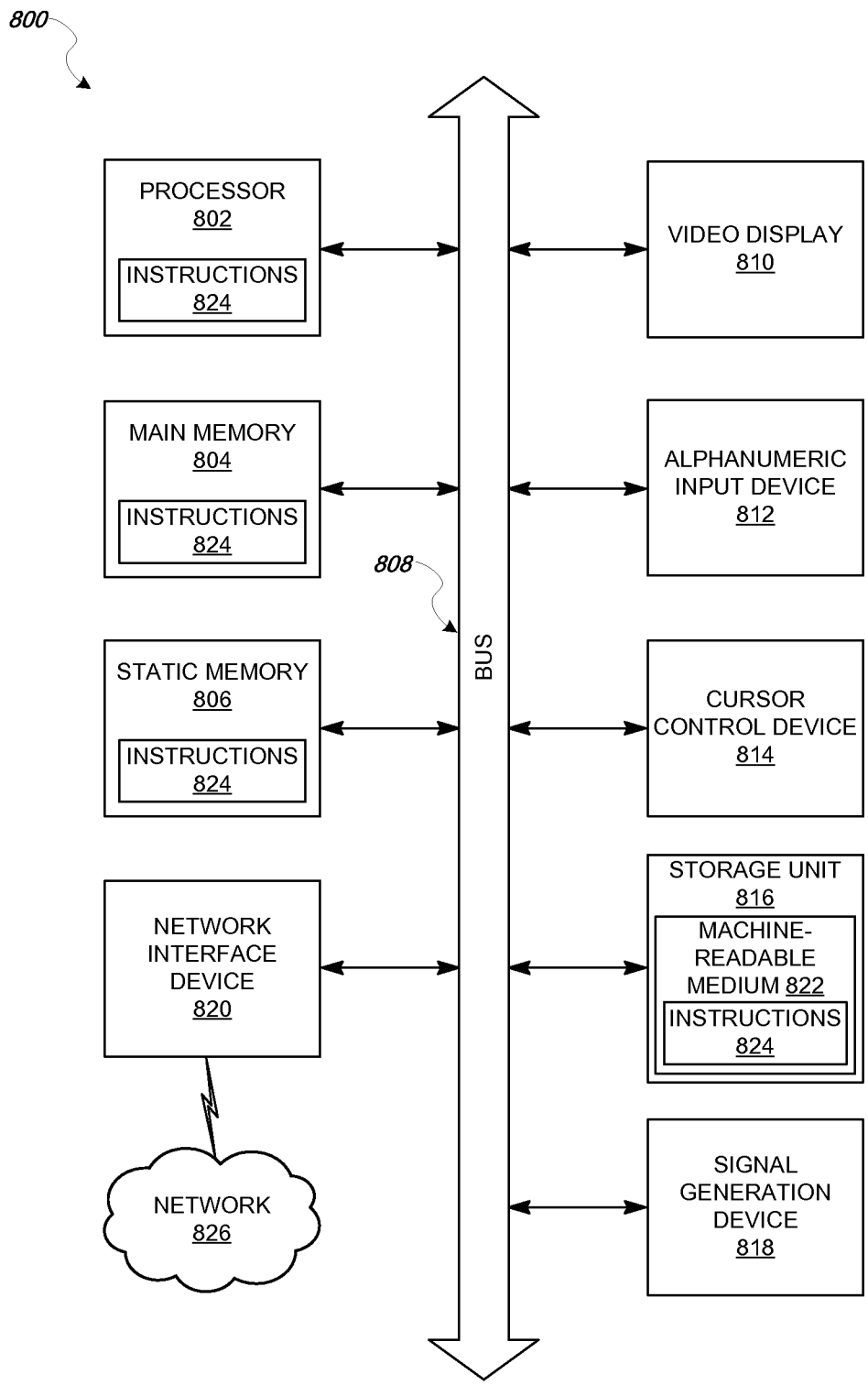
FIG. 8 is a block diagram illustrating components of a machine, according to some example embodiments, able to read instructions from a machine-readable medium and perform any one or more of the methodologies discussed herein.

Referring to FIG. 8, the block diagram illustrates components of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. Specifically, FIG. 8 shows the machine 800 in the example form of a computer system (e.g., a computer) within which the instructions 824 (e.g., software, a program, an application, an applet, an app, or other executable code) for causing the machine 800 to perform any one or more of the methodologies discussed herein can be executed, in whole or in part.

In alternative embodiments, the machine 800 operates as a standalone device or can be connected (e.g., networked) to other machines. In a networked deployment, the machine 800 can operate in the capacity of a server machine or a client machine in a server-client network environment, or as a peer machine in a distributed (e.g., peer-to-peer) network environment. The machine 800 can include hardware, software, or combinations thereof, and can as examples be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include any collection of machines that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 can contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 can be configurable to execute one or more modules (e.g., software modules) described herein.

The machine 800 can further include a video display 810 (e.g., a plasma display panel (PDP), a light emitting diode (LED) display, a liquid crystal display (LCD), a projector, a cathode ray tube (CRT), or any other display capable of displaying graphics or video). The machine 800 can also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, a signal generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein, including, for example, any of the descriptions of FIGS. 1, 2, 3, 4, 5, 6, and/or 7. The instructions 824 can also reside, completely or at least partially, within the main memory 804, within the processor 802 (e.g., within the processor's cache memory), or both, before or during execution thereof by the machine 800. The instructions can also reside in the static memory 806.

Accordingly, the main memory 804 and the processor 802 can be considered machine-readable media (e.g., tangible and non-transitory machine-readable media). The instructions 824 can be transmitted or received over a network 826 via the network interface device 820. For example, the network interface device 820 can communicate the instructions 824 using any one or more transfer protocols (e.g., hypertext transfer protocol (HTTP)). The machine 800 can also represent example means for performing any of the functions described herein, including the processes described in FIGS. 1, 2, 3, 4, 5, 6, and/or 7.

In some example embodiments, the machine 800 can be a portable computing device, such as a smart phone or tablet computer, and have one or more additional input components (e.g., sensors or gauges), not shown. Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components can be accessible and available for use by any of the modules described herein.

As used herein, the term "memory" refers to a machine-readable medium able to store data temporarily or permanently and can be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances can implement components, operations, or structures described as a single instance. Although individual operations of one or more methods are illustrated and described as separate operations, one or more of the individual operations can be performed concurrently, and nothing requires that the operations be performed in the order illustrated. Structures and functionality presented as separate components in example configurations can be implemented as a combined structure or component. Similarly, structures and functionality presented as a single component can be implemented as separate components. These and other variations, modifications, additions, and improvements fall within the scope of the subject matter herein.

Certain embodiments are described herein as including logic or a number of components, modules, or mechanisms. Modules can constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a field programmable gate array (FPGA) or an ASIC. A hardware module can also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, and such a tangible entity can be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor can be configured as respectively different special-purpose processors (e.g., comprising different hardware modules) at different times. Software (e.g., a software module) can accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules can be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors can constitute processor-implemented modules that operate to perform one or more operations or functions described herein. As used herein, "processor-implemented module" refers to a hardware module implemented using one or more processors.

Similarly, the methods described herein can be at least partially processor-implemented, a processor being an example of hardware. For example, at least some of the operations of a method can be performed by one or more processors or processor-implemented modules. As used herein, "processor-implemented module" refers to a hardware module in which the hardware includes one or more processors. Moreover, the one or more processors can also operate to support performance of the relevant operations in a "cloud computing" environment or as a "software as a service" (SaaS). For example, at least some of the operations can be performed by a group of computers (as examples of machines including processors), with these operations being accessible via a network (e.g., the Internet) and via one or more appropriate interfaces (e.g., an application program interface (API)).

The performance of certain operations can be distributed among the one or more processors, not only residing within a single machine, but deployed across a number of machines. In some example embodiments, the one or more processors or processor-implemented modules can be located in a single geographic location (e.g., within a home environment, an office environment, or a server farm). In other example embodiments, the one or more processors or processor-implemented modules can be distributed across a number of geographic locations.

Some portions of the subject matter discussed herein can be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities can take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like can refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A computer implemented method comprising:
generating in a database server, an identifier to identify a database task;
transmitting the identifier to a replication server;
receiving acknowledgement that the identifier is acknowledged by the replication server;
in parallel to transmitting the identifier to the replication server, committing a first portion of the database task in a computer-readable storage medium of the database server and placing a second portion of the database task in a waiting state, the first portion of the database task comprising at least a portion of a transaction and the second portion of the database task comprising one or more post-commit instructions; and
executing the one or more post-commit instructions of the database task in response to receiving acknowledgement from the replication server and determining the first portion of the database task is committed in the computer-readable storage medium of the database server, wherein the acknowledgement indicates the replication server committed the first portion of the database task.

2. The method of claim 1, wherein the identifier comprises an origin queue identifier (OQID).

3. The method of claim 1, further comprising instructing the transaction to sleep prior to receiving acknowledgement from the replication server and prior to storing the transaction in the database server.

4. The method of claim 1, further comprising transitioning from an asynchronous replication mode to a synchronous replication mode.

5. The method of claim 4, wherein the transitioning occurs automatically.

6. The method of claim 1, further comprising sending the transaction to a component interface library within the database server in parallel to storing the transaction in the database server.

7. The method of claim 1 further comprising:
determining the first portion of the transaction is committed in the database server; and
in response to determining the first portion of the transaction is committed, placing the second portion of the transaction in a processing queue for execution of the one or more post-commit instructions.

8. The method of claim 1 further comprising:
determining the first portion of the transaction is committed in the database server;
determining receipt of the acknowledgement from the replication server; and
in response to committing the first portion and receipt of the acknowledgement, placing the second portion of the transaction in a processing queue for execution of the one or more post-commit instructions.

9. A system comprising:
a first memory coupled to a first processor configured to execute a database server; and
a second memory coupled to a second processor configured to execute a replication server;
wherein the database server is configured to:
generate an identifier to identify a database task;
transmit the identifier to the replication server;
receive acknowledgement that the identifier is acknowledged by the replication server;
in parallel to transmitting the identifier to the replication server, commit a first portion of the database task in a computer-readable storage medium of the database server and placing a second portion of the database task in a waiting state, the first portion of the database task comprising at least a portion of a transaction and the second portion of the database task comprising one or more post-commit instructions; and execute the one or more post-commit instructions of the database task in response to receiving acknowledgement from the replication server and determining the first portion of the database task is committed in the computer-readable storage medium of the database server, wherein the acknowledgement indicates the replication server committed the first portion of the database task.

10. The system of claim 9, wherein the identifier comprises an origin queue identifier (OQID).

11. The system of claim 9, wherein the database server is further configured to instruct the transaction to sleep prior to receiving acknowledgement from the replication server and prior to storing the transaction in the database server.

12. The system of claim 9, wherein the database server is further configured to transition from an asynchronous replication mode to a synchronous replication mode.

13. The system of claim 12, wherein the transitioning occurs automatically.

14. The method of claim 9, wherein the database server is further configured to send the transaction to a component interface library within the database server in parallel to storing the transaction in the database server.

15. The system of claim 9, wherein the database server is further configured to:
    determine the first portion of the transaction is committed in the database server; and
    in response to determining the first portion of the transaction is committed, place the second portion of the transaction in a processing queue for execution of the one or more post-commit instructions.

16. The system of claim 9, wherein the database server is further configured to:
    determine the first portion of the transaction is committed in the database server;
    determine receipt of the acknowledgement from the replication server; and
    in response to committing the first portion and receipt of the acknowledgement, place the second portion of the transaction in a processing queue for execution of the one or more post-commit instructions.

17. A non-transitory machine-readable medium embodying instructions that, when executed by a processor perform operations comprising:
    generating in a database server, an identifier to identify a database task;
    transmitting the identifier to a replication server;
    receiving acknowledgement that the identifier is acknowledged by the replication server;
    in parallel to transmitting the identifier to the replication server, committing a first portion of the database task in a computer-readable storage medium of the database server and placing a second portion of the database task in a waiting state, the first portion of the database task comprising at least a portion of a transaction and the second portion of the database task comprising one or more post-commit instructions; and
    executing the one or more post-commit instructions of the database task in response to receiving acknowledgement from the replication server and determining the first portion of the database task is committed in the computer-readable storage medium of the database server, wherein the acknowledgement indicates the replication server committed the first portion of the database task.

18. The non-transitory machine-readable medium of claim 17, wherein the identifier comprises an origin queue identifier (OQID).

19. The non-transitory machine-readable medium of claim 17, wherein the operations further comprise instructing the transaction to sleep prior to receiving acknowledgement from the replication server and prior to storing the transaction in the database server.

20. The non-transitory machine-readable medium of claim 17, wherein the operations further comprise transitioning from an asynchronous replication mode to a synchronous replication mode.

21. The non-transitory machine-readable medium of claim 20, wherein the transitioning occurs automatically.

22. The non-transitory machine-readable medium of claim 17, wherein the operations further comprise sending the transaction to a component interface library within the database server in parallel to storing the transaction in the database server.

23. The non-transitory machine-readable medium of claim 17, wherein the operations further comprise:
    determining the first portion of the transaction is committed in the database server; and
    in response to determining the first portion of the transaction is committed, placing the second portion of the transaction in a processing queue for execution of the one or more post-commit instructions.

24. The non-transitory machine-readable medium of claim 17, wherein the operations further comprise:
    determining the first portion of the transaction is committed in the database server;
    determining receipt of the acknowledgement from the replication server; and
    in response to committing the first portion and receipt of the acknowledgement, placing the second portion of the transaction in a processing queue for execution of the one or more post-commit instructions.

* * * * *